(12) United States Patent
Morrow et al.

(10) Patent No.: US 10,308,528 B2
(45) Date of Patent: Jun. 4, 2019

(54) SYSTEM AND ASSOCIATED METHODOLOGY TO CLEAN CONTAMINANTS FROM A FLOWING STREAM

(71) Applicant: World Water Technologies, LLC., Parker, CO (US)

(72) Inventors: James Morrow, Parker, CO (US); Robert Herbst, Parker, CO (US)

(73) Assignee: World Water Technologies, LLC., Parker, CO (US)

( * ) Notice: Subject to any disclaimer, the term of this patent is extended or adjusted under 35 U.S.C. 154(b) by 0 days.

(21) Appl. No.: 15/826,964

(22) Filed: Nov. 30, 2017

(65) Prior Publication Data

US 2018/0148351 A1    May 31, 2018

Related U.S. Application Data

(60) Provisional application No. 62/428,092, filed on Nov. 30, 2016, provisional application No. 62/428,159, filed on Nov. 30, 2016.

(51) Int. Cl.

| | |
|---|---|
| *C02F 1/463* | (2006.01) |
| *C02F 1/00* | (2006.01) |
| C02F 103/00 | (2006.01) |
| C02F 101/22 | (2006.01) |
| H01M 10/44 | (2006.01) |
| C02F 101/20 | (2006.01) |
| C02F 1/461 | (2006.01) |
| C02F 103/10 | (2006.01) |
| C02F 103/16 | (2006.01) |

(52) U.S. Cl.
CPC .............. *C02F 1/463* (2013.01); *C02F 1/004* (2013.01); *C02F 1/001* (2013.01); *C02F 1/46104* (2013.01); *C02F 2001/007* (2013.01); *C02F 2101/20* (2013.01); *C02F 2101/203* (2013.01); *C02F 2101/22* (2013.01); *C02F 2103/007* (2013.01); *C02F 2103/10* (2013.01); *C02F 2103/16* (2013.01); *C02F 2201/007* (2013.01); *C02F 2201/4611* (2013.01); *C02F 2301/08* (2013.01); *H01M 10/44* (2013.01); *H01M 2220/10* (2013.01)

(58) Field of Classification Search
CPC .. C02F 1/463; C02F 1/001; C02F 2201/4611; C02F 2103/007; C02F 2001/007
See application file for complete search history.

(56) References Cited

U.S. PATENT DOCUMENTS 4,189,381 A  *   2/1980  Laferty ................... C02F 1/465
                                                        210/665
10,144,658 B2 * 12/2018  Morrow .................. C02F 1/463

* cited by examiner

*Primary Examiner* — Arun S Phasge
(74) *Attorney, Agent, or Firm* — Oblon, McClelland, Maier & Neustadt, L.L.P.

(57) ABSTRACT

A system for cleaning contaminants from a body of water includes a dam that restricts a flow of water in the body of water. The system also includes a generator that generates electric power from the body of water, and one or more electrodes that induce an electrocoagulation current upstream of the dam. A filter press then removes contaminants that are precipitated from the water of the body of water by the electrocoagulation current.

20 Claims, 6 Drawing Sheets

SYSTEM AND ASSOCIATED METHODOLOGY TO CLEAN CONTAMINANTS FROM A FLOWING STREAM

CROSS-REFERENCE TO RELATED APPLICATION

This application claims the benefit of priority to U.S. provisional application No. 62/428,159 and to U.S. provisional application No. 62/428,092, both filed on Nov. 30, 2016, the entire contents of each of which are incorporated herein by reference.

BACKGROUND

Field

The present disclosure is directed to a system and associated methodology for cleaning contaminants from a flowing body of water. Specifically, the present disclosure is directed to a system and associated methodology that can be rapidly deployed in order to quickly and efficiently clean a contaminated flowing body of water.

Description of the Related Art

Industrial operations, farming, natural disasters, and accidents may all results in contamination of rivers, streams, and other flowing bodies of water. Conventional methods of cleaning contaminants from such flowing bodies of water may require the flow of water to be diverted, and may allow significant amounts of contaminants to flow downstream as the cleaning system is installed. Often times there are no readily accessible source of power to run the equipment employed in the clean-up effort, and there may not be sufficient room on the banks of a contaminated body of water to allow flow to be diverted.

SUMMARY

The present disclosure solves one or more of the above-identified problems that exist in the conventional methods used to clean contaminants from a flowing body of water. To this end, the present disclosure includes at least the following novel features.

In an exemplary aspect of the disclosure a system for cleaning contaminants from a body of water includes a dam that restricts a flow of water in the body of water. The system also includes a generator that generates electric power from the body of water, and one or more electrodes that induce an electrocoagulation current upstream of the dam. A filter press then removes contaminants that are precipitated from the water of the body of water by the electrocoagulation current.

In the system, the dam may include at least two I-beams that are driven into a bottom of the body of water, and at least one concrete slab disposed between the at least two I-beams.

In the system, the concrete slab may be reinforced with at least one of rebar and fiberglass.

In the system, the at least one concrete slab includes at least one opening to allow a predetermined flow of water from an upstream side of the dam to a downstream side of the dam.

In the system, the generator is disposed upstream of the dam.

The system may also include at least one hoist to lower the one or more electrodes into the body of water upstream of the dam.

In the system, the filter press includes a suction member to draw a combination of water and contaminants into the filter press.

In the system, the suction member includes a hose that may be lowered into a sludge collection zone established at a bottom of the body of water.

The system may further include a boom to contain contaminants at a surface of the body of water, where the boom may be deployed upstream of the dam.

In the system, the boom may be formed of foam and/or may be inflatable.

The system may further include a weir to remove the contaminants contained by the boom.

In another exemplary aspect, a method of cleaning contaminants from a body of water includes restricting, with a dam, a flow of water at a predetermined location of the body of water. The method also includes generating, with a generator, electric power from the body of water, and generating, with one or more electrodes, an electrocoagulation current upstream of the dam. The method further includes removing, with a filter press, contaminants that are precipitated from the water of the body of water by the electrocoagulation current.

The method may further include driving at least two I-beams into a bottom of the body of water, and installing a concrete slab between the two I-beams in order to form the dam.

The method may further include digging a sludge settling zone at a bottom of the body of water, where the sludge settling zone may capture contaminants as the contaminants precipitate out of the water, the sludge settling zone being upstream of the dam.

The method may also include containing, with a boom, contaminants on a surface of the body of water, where the boom is disposed upstream of the dam.

The method may also include removing, with a weir, the contaminants contained by the boom.

The method may also include suctioning water including the contaminants captured in the sludge settling zone, providing the water including the contaminants to the filter press.

The method may also include separating the water from the contaminants at the filter press.

The method may also include storing, at least temporarily, the electric power generated by the generator in one or more batteries.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
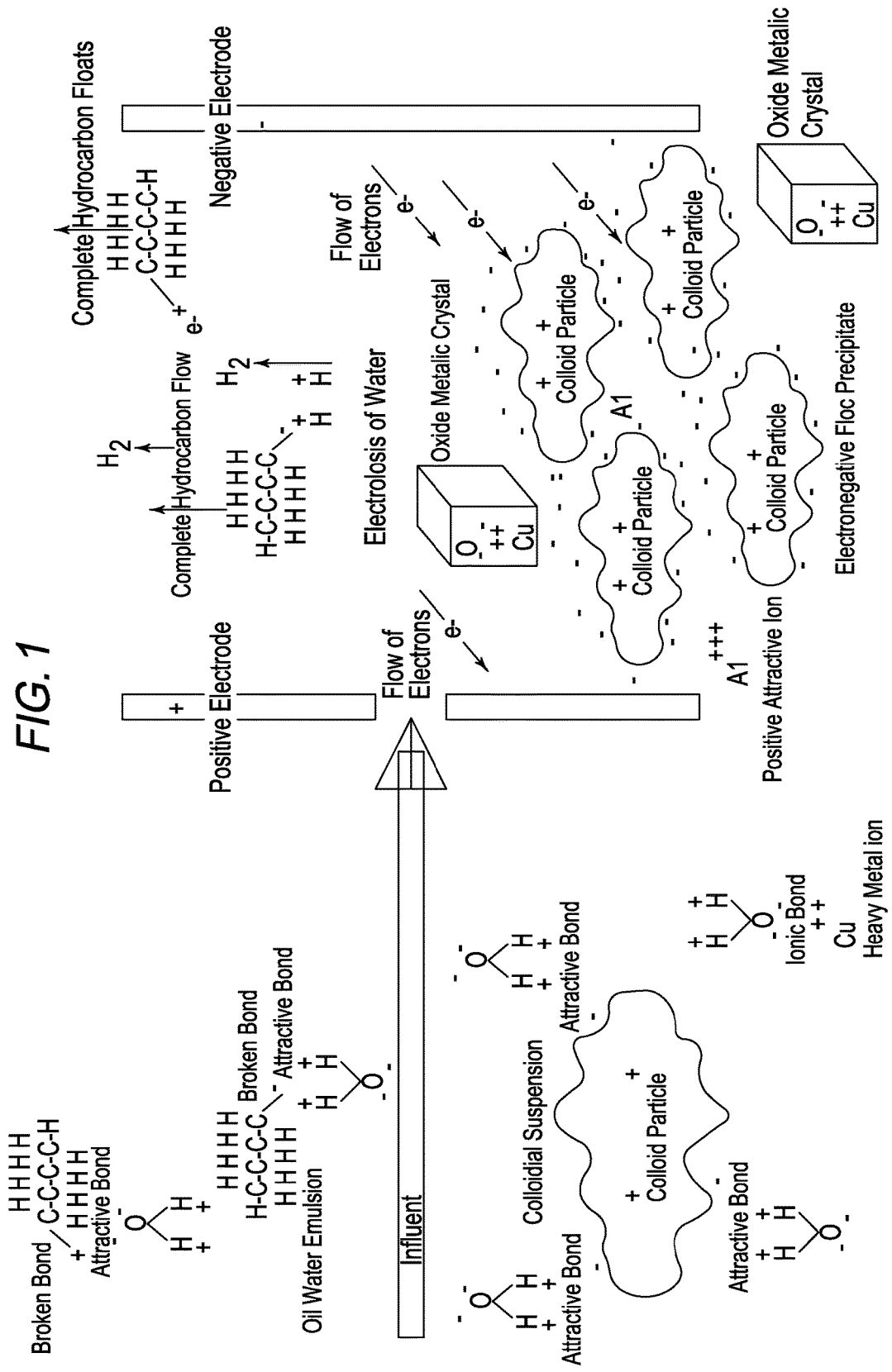
FIG. 1 is a diagram of the process of electrocoagulation according to exemplary aspects of the present disclosure.

Referring now to the drawings, wherein like reference numerals designate identical or corresponding parts throughout the several views, FIG. 1 illustrates the process of electrocoagulation according to exemplary aspects of the present disclosure. Electrocoagulation uses electricity as an electromotive force to drive chemical reactions in solutions, suspensions, emulsions, or colloidal dispersions. Such solutions, suspensions, emulsions and colloidal dispersions frequently result from cleaning, washing, and rinsing processes used by manufacturing or service companies. Examples of such solutions, suspensions, emulsions, or colloidal dispersions include municipal and/or industrial sewage or waste, refining, drilling or production waste from oil fields, or a mine spill or flood.

Electrocoagulation (EC) uses a particular form of direct current that is introduced into an aqueous influent as it passes between electrode plates of an EC module. The energy from the electricity causes a shift in equilibrium of a reaction to less than equilibrium, providing a mechanism for removing dissolved, suspended, emulsified, or dispersed elements, ions, molecules, or particles (collectively referred to herein as contaminants). The aqueous stream, after treatment, contains very minute levels of contaminants.

EC can precipitate dissolved heavy metals by a combination of oxidation/reduction reactions that in many cases produce oxide crystals that are very stable and insoluble. For example, hexavalent chromium is reduced to a precipitate of trivalent chromium, and sulfides are reacted with iron from the water itself, or from steel electrodes, to form a precipitate of ferric sulfide. Copper, lead, nickel, zinc, and other metals may also be oxidized into crystal form and precipitated out of the water. Once precipitated out of the water, the contaminants may be concentrated in a sluice and removed as sludge and recycled.

Some contaminant metals require an anion or cation to be present in order to form a precipitate. These include calcium, magnesium, molybdenum, for example. Anions and/or cations may already be present in the aqueous flow, or can be added. Adding anions or cations can also favorably adjust the pH of the water. For example, heavy metallic crystals can have a positive nucleus and attract electron rich hydroxide floc and colloidal solids into a settling precipitate. The precipitate may then be separated in a settling pond or clarifier after some of the heavy metals are classified and concentrated.

Lighter than water organic and inorganic compounds may float to the surface of a body of water that is being cleaned and collected in a weir to be diverted and handled by a separate process as one of ordinary skill would recognize. For example, these compounds may be recycled or safely disposed of.

FIG. 1 illustrates the reactions described above. The positive and negative electrodes introduce an electric current to male equilibrium shifts in the contaminants present in the water likely. Compounds that precipitate out are removed, and any unstable compound is broken down into simpler, more stable insoluble compounds.

Figure 2:
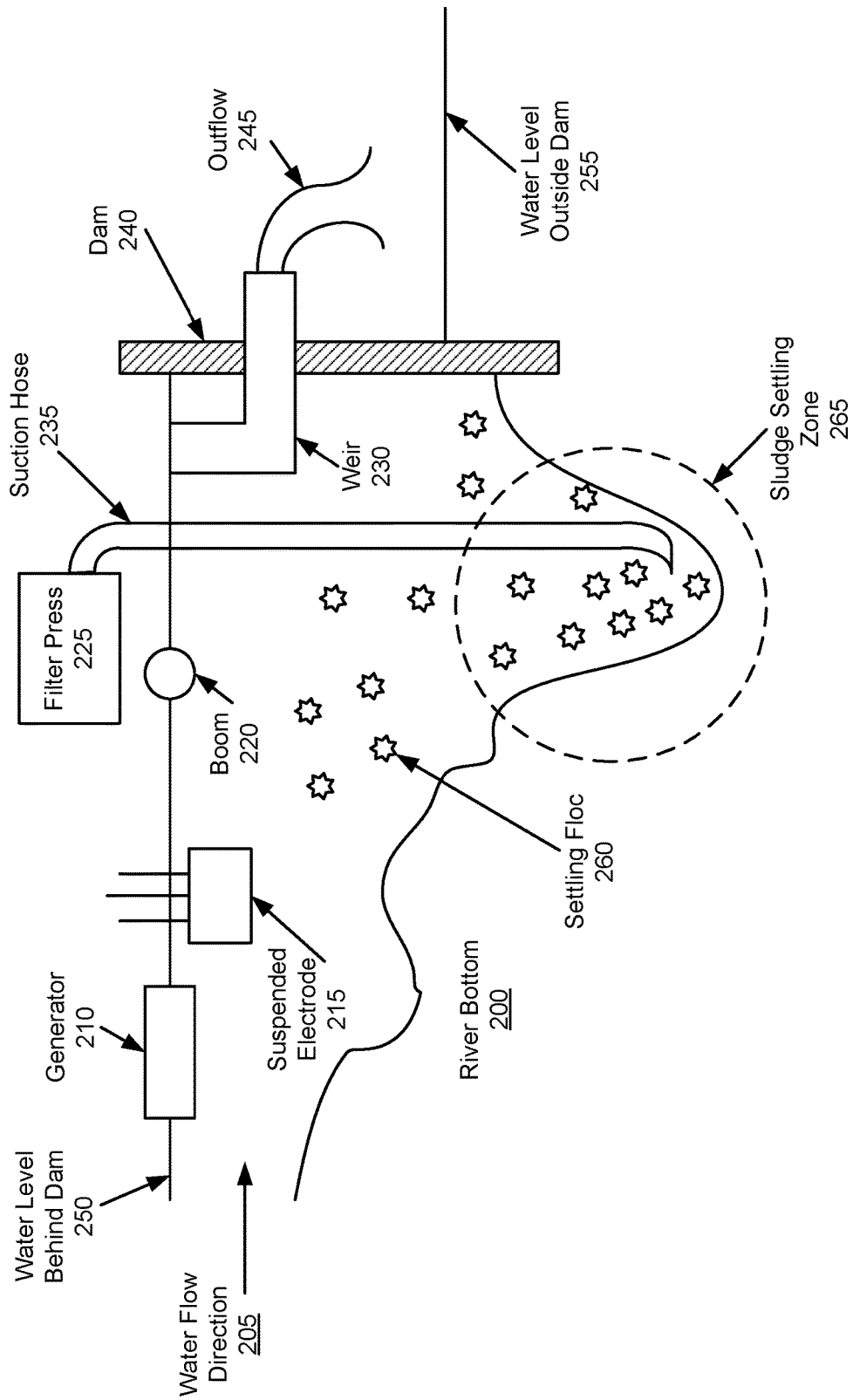
FIG. 2 is a diagram of a system for cleaning contaminants from a flowing body of water according to exemplary aspects of the present disclosure.

FIG. 2 illustrates a system for removing contaminants from a body of water in accordance with exemplary aspects of the present disclosure. In FIG. 2, the flow of water is indicated by the arrow 205, the water level behind a dam 240 is indicated by the horizontal line 250, and the water level outside the dam 240 is indicated by the horizontal line 255. A sludge settling zone 265 is created in the river bottom 200 by dredging or excavating. The dredging or excavating also serves to remove some of the contamination.

A dam 240 is then installed as will be described later. The dam forces the flow of water to pass through a weir 230, which collects and diverts contaminants that are lighter than water. A clean water outflow 245 is then expelled downstream through a pipe connected to the weir 230.

Upstream of the dam 240, one or more water-driven generators 210 are installed in order to provide power to the one or more electrodes 215 used to treat the flowing water. Power from the generators 210 may also be used to power other components of the system such as pumps to carry water and contaminants to the filter press 225 (described below). Of course, other power sources are also possible. For example, fossil fuel-based generators that run on gasoline, diesel, natural gas, propane, etc., may also be used. As such, the specific generator used is not limiting upon the present disclosure.

The electrodes 215 are lowered into the water and cause a DC current to flow through the water in order to precipitate a settling floc 260 that ultimately settles in the sludge settling zone 265. As such the electrodes are connected to the generator 210 in order to receive the power necessary to generate the DC current. The electrodes 215 are illustrated as rectangular plates, but may be formed into other shapes. For example, the electrodes 215 may be circular, triangular or any other geometric shape. The electrodes 215 may also have a three-dimensional configuration, such as tubes through which the flowing water passes. Baffles may also be included in the tubes to disrupt laminar flow and increase the amount of water exposed to the electric current and/or to increase the interaction among the different elements and compounds taking part in the chemical reaction to precipitate the contaminants out of the water. As such, the electrodes 215 illustrated in FIG. 2 are merely exemplary.

A filter press 225, and associated pumping equipment, may suck the settling floc 260 and water from the sludge settling zone 265 and remove the floc 260 from the water before returning the water to the body of water being cleaned. To this end, the filter press 225 may include a suction hose 235 that is lowered into the sludge settling zone 265. As can be appreciated, the filter press 225 may include one or more permeable members of different fineness to remove the floc 260. The fineness of the permeable membranes may also be adjusted based on the type of contaminant present in the body of water. Magnets, or other active components, may also be used in the filter press 225 to draw the contaminants out of the water. Other forms of filtering are also possible as one of ordinary skill would recognize.

A boom 220 may prevent contaminants that are lighter than water from dispersing along the surface of the water, and may even be used to corral the contaminants towards the weir 230. The boom 220 may be made of foam, or may be inflatable, and may be made of any material that floats without departing from the scope of the present disclosure.

Figure 3:
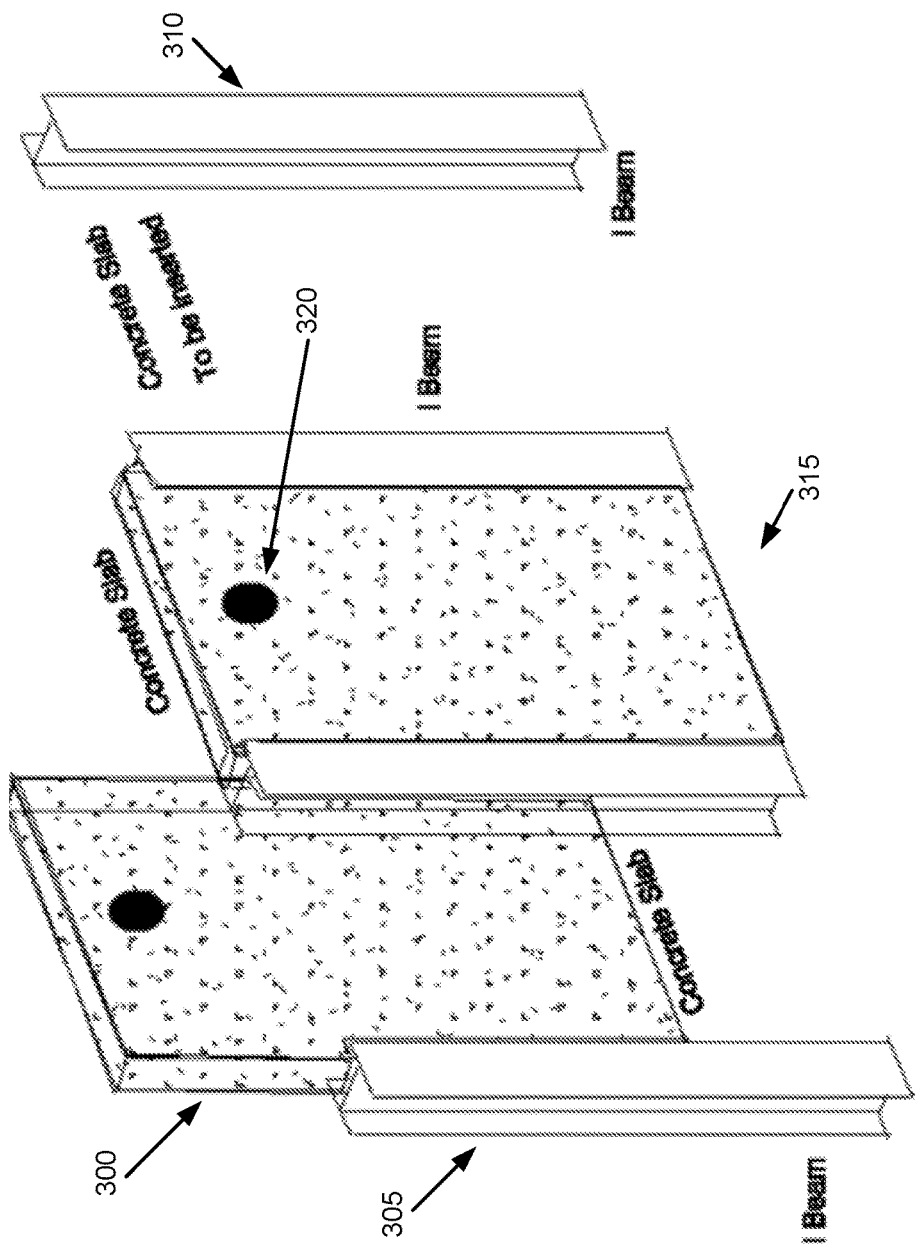
FIG. 3 is diagram of a rapidly deployable dam according to exemplary aspects of the present disclosure.

As described above, a dam 240 is installed in order to regulate the flow of water in the body of water to be cleaned of contaminants. FIG. 3 is a three-dimensional figure of the dam 204 according to exemplary aspects of the present disclosure. The dam 240 includes a concrete slab 300 which is held in place by two I-beams 305 and 310 that are driven into the river bottom as described below with reference to FIG. 4. The concrete slab 300 may include an opening 320 through which a pipe from, for example the weir 230, passes in order to expel cleaned water downstream. As can be appreciated, the concrete slab 300 may be reinforced with rebar and/or fiberglass in order to withstand the water pressure exerted by the flow 205 (see FIG. 2). The concrete slab 300 may span the entire width of smaller bodies of water, but more likely several concrete slabs 300 of a predetermined width are installed along a series of buried I-beams 305, 310. Additional reinforcement on the downstream side of the dam 240 may also be used, particularly in fast-flowing bodies of water.

FIG. 4 illustrates a method of installing one or more concrete slabs in order to form the dam 240. In FIG. 4A, a first I-beam 410 is driven into the riverbed 405. The I-beam 410 in FIG. 4A is arbitrarily referred to as the left I-beam, but it could also be the right I-beam without departing from the scope of the present disclosure. The I-beam 410 may be driven into the riverbed 405 using any known method. Once the I-beam is driven to a predetermined depth, the second I-beam 415, referred to as the right I-beam in FIG. 4B, is driven into the riverbed 405 to a predetermined depth. As can be appreciated, both I-beams 410 and 415 may be driven into the riverbed 405 to the same, or to different depths. For example, on I-beam may be driven into bedrock which may require one depth, and the other I-beam may be driven into silty mud, requiring a second depth. Thus, the depth to which each I-beam is driven into the riverbed 405 is not limiting upon the present disclosure.

Figure 4A:
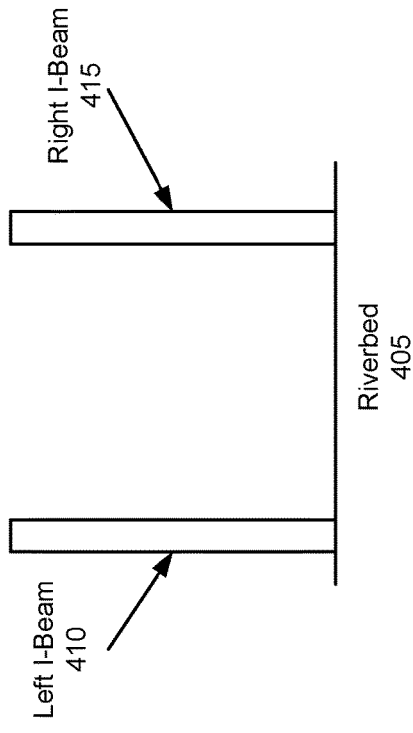
FIG. 4A is a diagram of an exemplary first step in deploying the rapidly deployable dam of FIG. 3.
Figure 4B:
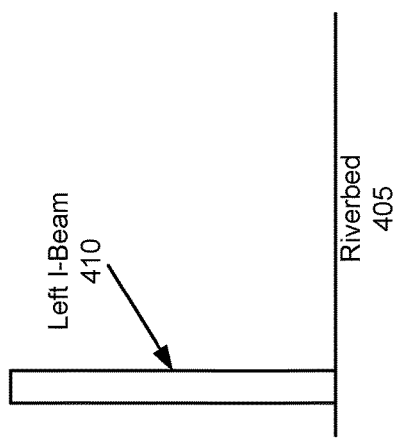
FIG. 4B is a diagram of an exemplary second step in deploying the rapidly deployable dam of FIG. 3.
Figure 4C:
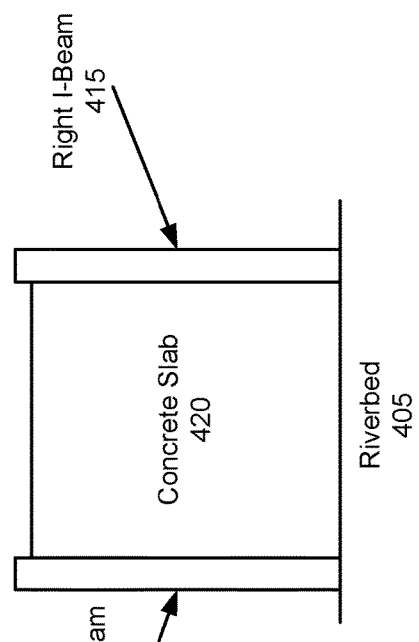
FIG. 4C is a diagram of an exemplary third step in deploying the rapidly deployable dam of FIG. 3.
Figure 4D:
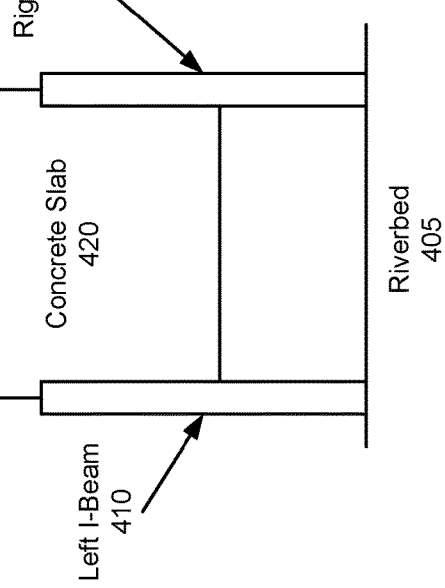
FIG. 4D is a diagram of an exemplary fourth step in deploying the rapidly deployable dam of FIG. 3.

After both I-beams 410 and 415 are driven into the riverbed 405, a concrete slab 420 is lowered between the I-beams 410 and 415 as illustrated in FIG. 4C. The thickness of the slab 420 is such that the slab fits with the channels of the I-beams 410 and 415. The height of the slab 420 is such that the water on the upstream side of the slab 420 cannot flow over the upper edge of the slab 420 once the slab 420 is in place as illustrated in FIG. 4D. As can be appreciated, FIG. 4 illustrates the installation of a single slab 420, but several such slabs may be needed in order to form a complete dam 240 of the body of water.

As noted previously, one of the drawbacks of conventional systems and methods of cleaning contaminants from a body of water is that the conventional systems cannot be rapidly deployed. The I-beam/slab modular structure of the dam 240 makes this dam both portable and capable of rapid deployment. The other components of the system are also capable of rapid deployment and easy transportation due to their modular nature.

Figure 5:
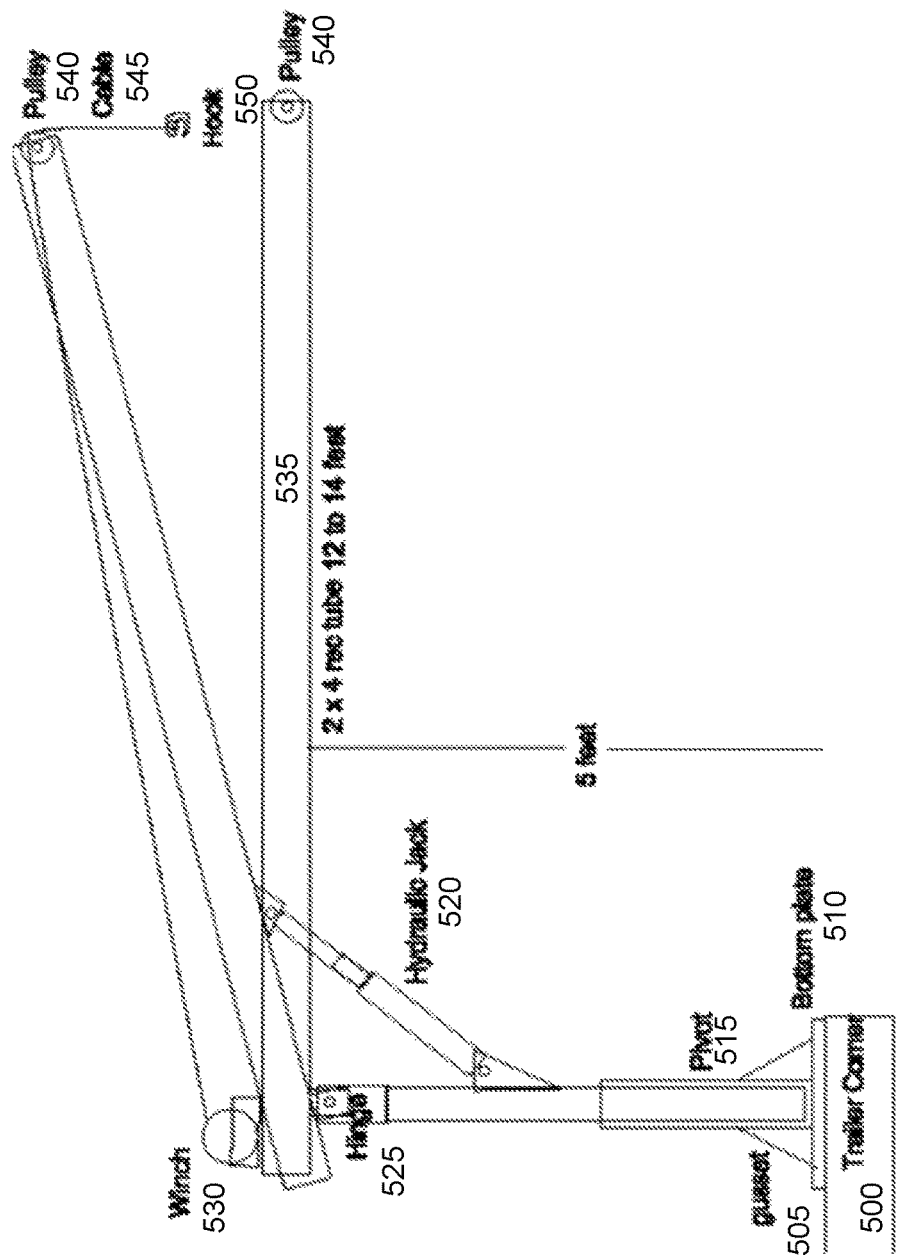
FIG. 5 is a diagram of a hoist used to suspend a plate electrode according to exemplary aspects of the present disclosure.

For example, the electrodes 215 described with reference to FIG. 2 may be deployed using a hoist as illustrated in FIG. 5. The hoist of FIG. 5 may be attached to a vehicle, such as a trailer 500, a barge or other vessel. The hoist includes a bottom plate 510 which is affixed to the trailer 500, and a gusset 505 that holds and reinforces a pivot 515. The main arm 535 of the hoist may be pivoted by the pivot 515 to any necessary location. The main arm 535 is attached to the pivot by a hinge 525, and is raised, lowered and otherwise supported by a hydraulic jack 520. A winch 530 located on the main arm 535 controls a length of cable 545 that runs along the main arm 535 to a pulley 540. A hook 550 on which the electrode 215 is attached is installed at the end of the cable 545. By operating the winch 530 the cable 545 can be made to raise and lower the electrode 215 as needed.

As can be appreciated, other hoist designs are possible. For example, the main arm 535 may be telescoping to add another degree of freedom in positioning the electrode 215. The hydraulic jack 520 may also be replaced with a mechanical jack that provides a predetermined amount of mechanical advantage. The jack used in the hoist may also be manually operated, operated by an electric motor, or operated by an internal combustion engine. Likewise the winch 530 may be manually operated, operated by an electric motor, or operated by an internal combustion engine. Moreover, in an exemplary aspect, the winch 530 may be omitted, and a fixed length of cable may be attached to the end of the main arm 535. The hydraulic jack 520 may then be used to control the depth of the electrode 215 by raising or lowering the main arm 535. Thus, the specific hoist described above is merely an example, and does not limit the present disclosure.

Next, an exemplary method of cleaning contaminants from a body of water is described with reference to FIG. 6. In step 600, the dam 240 is installed as described above. The weir 230 may also be deployed at step 600. Then the boom 220 is deployed at 605, and a sludge pit is dug at 610. Digging the sludge pit early in the process allows the contaminants to begin settling for removal. The process of digging also removes contaminants that may have already settled. At step 615, the generator 210 is deployed upstream of the dam 240. As noted above, the generator 210 may generate electricity from the flow of water. The generated electricity may be used immediately by other components of the system, or may be stored in, for example, one or more batteries such as lithium ion batteries, lead acid batteries, etc.

At step 620, the electrodes 215 are lowered into the water upstream of the dam 240 in order to cause electrocoagulation of the contaminants. At step 625 the filter press 225 may be deployed in order to remove contaminants that have settled in the sludge pit.

One of ordinary skill in the art would recognize that the above method of deploying the cleaning system described herein may be performed multiple times in order to deploy several generators, electrodes, and filter presses to reduce the amount of time needed to clean the body of water and/or to clean larger contaminant spills or larger bodies of water.

Figure 6:
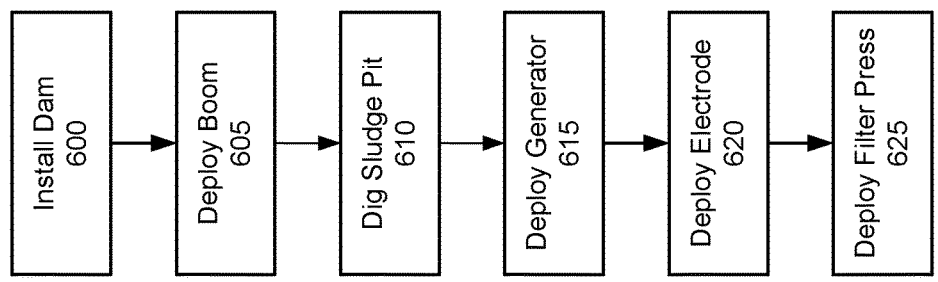
FIG. 6 is an algorithmic flowchart of a method of deploying a system for cleaning contaminants from a flowing body of water according to exemplary aspects of the present disclosure.

The steps in FIG. 6 have been described in a particular sequence only for the sake of clarity. However, these steps can be performed different orders, in parallel, or even in reverse order. Thus, FIG. 6 is merely exemplary and other variations of the method are possible without departing from the scope of the present disclosure.

In addition, terms such as river bottom and riverbed are used herein solely for the sake of clarity. However, the inventive systems and methods described herein are not limited to rivers. They can be used in creeks, streams, canals, lakes, marshes, bays, drain ditches, and any other body of water as one of ordinary skill would recognized. Obviously, numerous modifications and variations of the present invention are possible in light of the above teachings. It is therefore to be understood that within the scope of the appended claims, the invention may be practiced otherwise than as specifically described herein.

The invention claimed is:

1. A system for cleaning contaminants from a body of water, comprising:
   a dam configured to restrict a flow of water in the body of water;
   a generator configured to generate electric power from the body of water;
   one or more electrodes configured to induce an electrocoagulation current upstream of the dam; and
   a filter press configured to remove contaminants that are precipitated from the water of the body of water by the electrocoagulation current.

2. The system according to claim 1, wherein the dam includes at least two I-beams configured to be driven into a bottom of the body of water, and at least one concrete slab disposed between the at least two I-beams.

3. The system according to claim 2, wherein the concrete slab is reinforced with at least one of rebar and fiberglass.

4. The system according to claim 2, where in the at least one concrete slab includes at least one opening to allow a predetermined flow of water from an upstream side of the dam to a downstream side of the dam.

5. The system according to claim 1, wherein the generator is disposed upstream of the dam.

6. The system according to claim 1, further comprising at least one hoist to lower the one or more electrodes into the body of water upstream of the dam.

7. The system according to claim 1, wherein the filter press includes a suction member configured to draw a combination of water and contaminants into the filter press.

8. The system according to claim 7, wherein the suction member includes a hose configured to be lowered into a sludge collection zone established at a bottom of the body of water.

9. The system according to claim 1, further comprising a boom configured to contain contaminants at a surface of the body of water, the boom being deployed upstream of the dam.

10. The system according to claim 9, wherein the boom is formed of foam.

11. The system according to claim 9, wherein the boom is inflatable.

12. The system according to claim 9, further comprising a weir configured to remove the contaminants contained by the boom.

13. A method of cleaning contaminants from a body of water, comprising:
   restricting, with a dam, a flow of water at a predetermined location of the body of water;
   generating, with a generator, electric power from the body of water;
   generating, with one or more electrodes, an electrocoagulation current upstream of the dam; and
   removing, with a filter press, contaminants that are precipitated from the water of the body of water by the electrocoagulation current.

14. The method according to claim 13, further comprising:
   driving at least two I-beams into a bottom of the body of water; and
   installing a concrete slab between the two I-beams in order to form the dam.

15. The method according to claim 13, further comprising:
   digging a sludge settling zone at a bottom of the body of water, the sludge settling zone being configured to capture contaminants as the contaminants precipitate out of the water, the sludge settling zone being upstream of the dam.

16. The method according to claim 15, further comprising:
   suctioning water including the contaminants captured in the sludge settling zone; and
   providing the water including the contaminants to the filter press.

17. The method according to claim 16, further comprising separating the water from the contaminants at the filter press.

18. The method according to claim 13, further comprising:
   containing, with a boom, contaminants on a surface of the body of water, the boom being disposed upstream of the dam.

19. The method according to claim 18, further comprising:
   removing, with a weir, the contaminants contained by the boom.

20. The method according to claim 13, further comprising storing, at least temporarily, the electric power generated by the generator in one or more batteries.

* * * * *